Feb. 28, 1961 P. LA GRUTTA 2,972,833
PLASTIC BLOCK ASSEMBLY
Filed July 5, 1957 2 Sheets-Sheet 1
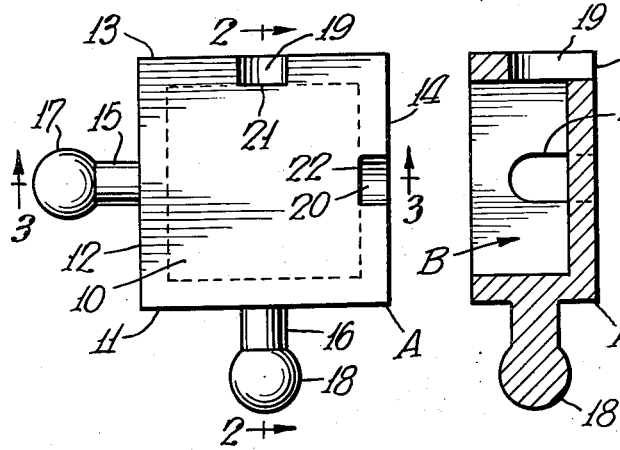
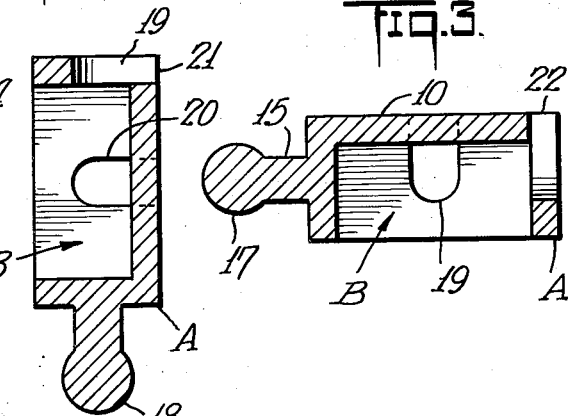
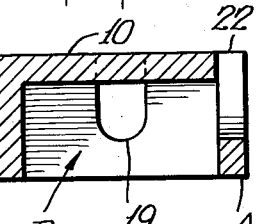
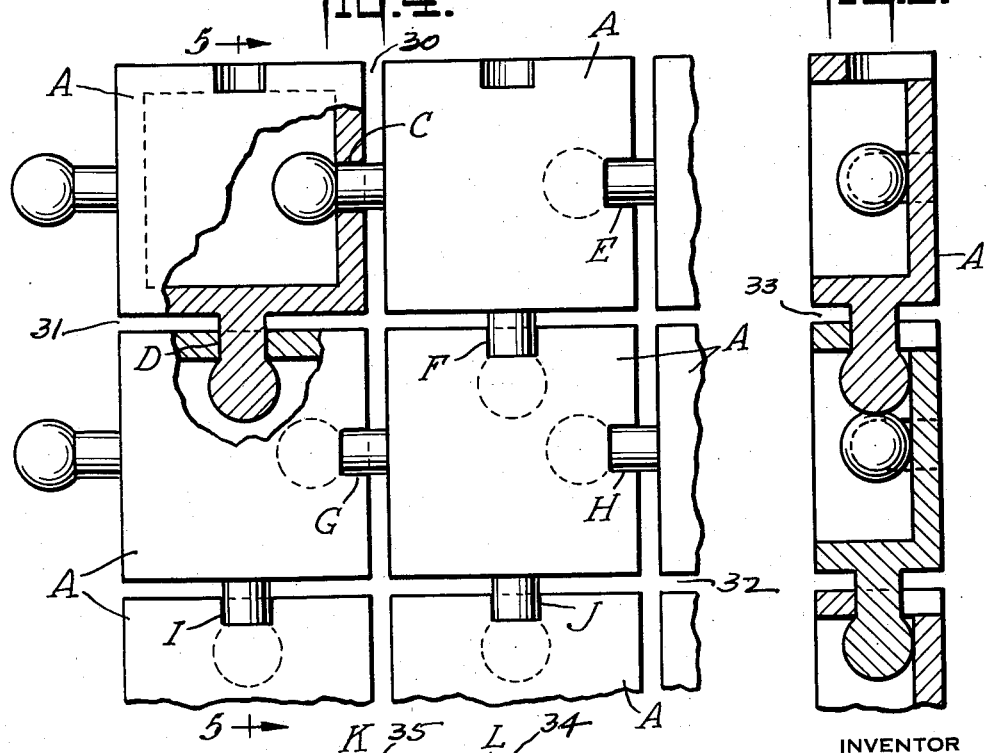
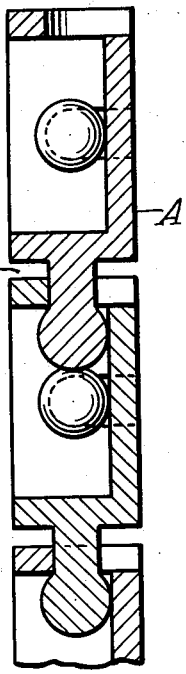
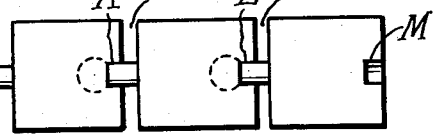
INVENTOR
Pascal La Grutta
BY
ATTORNEY

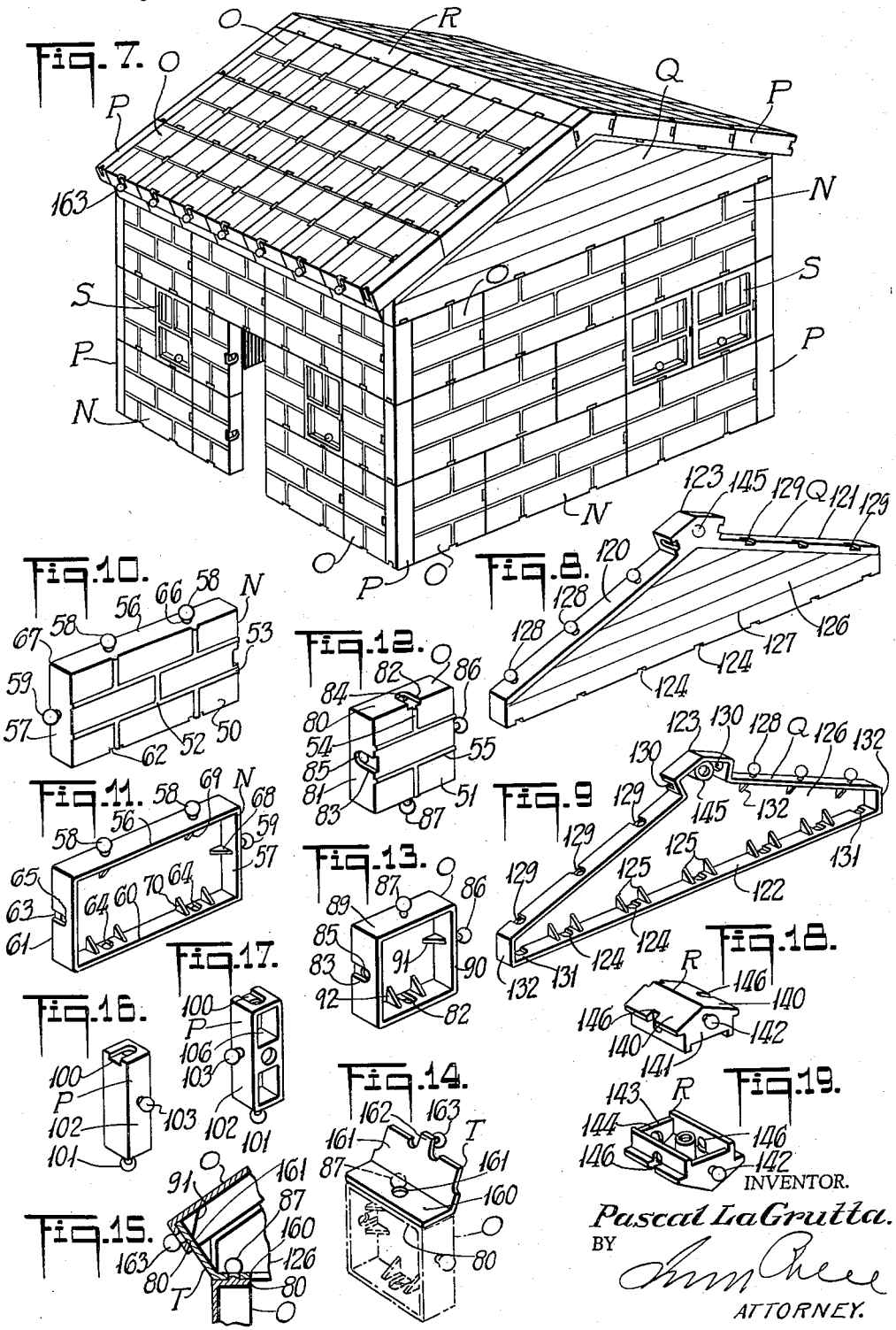
Feb. 28, 1961 — P. LA GRUTTA — 2,972,833
PLASTIC BLOCK ASSEMBLY
Filed July 5, 1957 — 2 Sheets-Sheet 2
INVENTOR.
Pascal La Grutta.
ATTORNEY.

United States Patent Office 2,972,833
Patented Feb. 28, 1961

2,972,833
PLASTIC BLOCK ASSEMBLY

Pascal La Grutta, Newark, N.J., assignor to Lapin Products, Inc., Newark, N.J., a corporation of New York Filed July 5, 1957, Ser. No. 670,025

2 Claims. (Cl. 46—25)

The present invention relates to a plastic block assembly and it particularly relates to a plastic block assembly which may be used for construction models, small replicas of building or other structures, or in a construction game, or in many other connections.

It is among the objects of the present invention to provide an assembled, composite plastic wall or structure which may be readily assembled and disassembled to form a building, a game, an ornament, or in a wide variety of other connections.

A further object of the present invention is to provide a novel structural element, desirably molded of plastic materials, which may be readily assembled with similar shape or different shape and size ornaments to form various types of buildings, walls, closures, covering structures or other assemblies useful either as a building or a model.

A still further object of the present invention is to provide a novel plastic assembly system in which a series of block-like or rectangular or cup-shaped members may be integrally provided with edge attachments so that they can be built up or assembled together to form much larger assembled structures to duplicate in large or miniature size various articles of manufacture, machine parts, building parts, or a wide variety of structures.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable, according to one embodiment of the present invention, to provide a series of plastic plaques which will have cooperating recesses and prongs, and which may be fitted together or connected together to form a linked or associated assembly which may take the form of either a wall, plate, building or other structure, in which the various plaques will be capable of being assembled in varying position in respect to each other.

In the preferred form of the invention, the plaques are square, triangular or hexagonal, with four to six side flanges, two adjacent or opposite flanges being provided with prongs which are designed to snap into position therein.

It has been found preferable to form the plaques of a soft, flexible plastic material, such as rigid polyethylene, which will enable the prongs, and particularly the ball-headed ends of the prongs, to be snapped into the openings in the walls or flanges of adjacent plaques.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a top plan view of one of the plaque elements, according to the present invention.

Fig. 2 is a transverse sectional view upon the line 2—2 of Fig. 1.

Fig. 3 is a transverse sectional view upon the line 3—3 of Fig. 1.

Fig. 4 is a top plan view of a plurality of plaques, according to Figs. 1 and 2, assembled to form the assembled structure.

Fig. 5 is a transverse vertical sectional view upon the line 5—5 of Fig. 4.

Fig. 6 is a top plan view upon a smaller scale as compared to Figs. 1 to 5, showing how a series of plaques may be latched together to form a continuous row, bracelet, chain or necklace.

Fig. 7 is a top perspective view showing how a plurality of the plaques, Figs. 1 to 6, may be assembled in close juxtaposition to form a miniature or replica building construction.

Fig. 8 is a side perspective view of a triangular element which may be utilized to form an upper end of one of the walls to support the sloping roof constructions of Fig. 7.

Fig. 9 is an interior perspective view of the triangular element of Fig. 8.

Fig. 10 is a side perspective view indicating a wall or brick unit to be utilized in the assembly of Fig. 7.

Fig. 11 is an interior perspective view showing the other side of the wall element of Fig. 10.

Fig. 12 is a front perspective view of an alternative wall construction of square contour.

Fig. 13 is a side perspective view showing the interior of the element of Fig. 12 but reversed to show the male fastening elements at the top of the right side.

Fig. 14 is a top perspective view showing an oblique connection element designed to permit the wall structure to be joined with the edge of a roof structure at an angle to the wall structure.

Fig. 15 is a fragmentary side sectional view illustrating the connection between the vertical wall elements and the oblique slanting roof structure of Fig. 7.

Fig. 16 is an outside perspective view showing the corner beam structural element removed from the assembly of Fig. 7.

Fig. 17 is a rear view of the corner beam assembly element of Fig. 16 taken from the inside of the element.

Fig. 18 is a top perspective view of a roof peak element separated from the assembly of Fig. 7.

Fig. 19 is a top perspective view of the inverted element of Fig. 18.

Referring to Figs. 1 to 3, the plaques A are shown as being square, having a base 10 and the side walls 11, 12, 13 and 14, which extend perpendicularly away from each of the edges of the base 10 and form a cup-like structure, as indicated at B in Figs. 2 and 3.

The base 10 may also be of triangular, hexagonal or octagonal shape, if desired.

From two of the sides there project the necks 15 and 16 carrying the ball ends 17 and 18. The other two sides are provided with the slots 19 and 20, which extend through to the base, as indicated at 21 and 22.

These plaques are desirably molded of a resin or synthetic plastic, such as rigid polyethylene, which will give them the desired amount of flexibility.

The resinous material is of a type relatively rigid in thick section, but relatively flexible in thinner section.

The diameters of the balls 17 and 18 are such that they must be squeezed to be inserted through the slots 19 and 20 and so that they will snap inside of the slots when they are forced therethrough, remaining substantially permanently in position with the necks 15 and 16.

Where the necks 15 and 16 are made sufficiently long, there may be sufficient space, as indicated at 30, 31, 32, 33, 34, and 35, to permit flexibility between the adjacent plaques A.

On the other hand, where the necks 15 and 16 are very short, so that the balls 17 and 18 will barely clear the openings 19 and 20, the edge flanges of the plaques will be closely pressed together to give a more rigid structural assembly, as will be described in connection with Fig. 7.

In the assembly of Figs. 4 and 5, a group of plaques are shown assembled with the connections being made at C, D, E, F, G, H, I and J, and with the spaces as shown at 30 to 35.

These connections will permit the plaques A to move in respect to one another, but at the same time will hold them firmly together so that a permanent flexible fabric is formed.

If desired, different plaques may be of different colors or carry different letters, and the arrangements may be utilized as a game.

In one embodiment, as indicated in Fig. 6, the ball 17 and the notch 20 may be utilized without the ball 18 and the notch 19. In this case a string of plaques may be obtained, as shown in Fig. 6, which may be used as a bracelet, charm, belt, or in other connections.

In such an elongated object the connections are formed at K, L and M, and they permit the device to be extended around the wrist, neck or waist of a wearer, or for other connections where strings of plastic elements are utilized for decorative, play or game purposes.

In the arrangement of Figs. 7 to 19, the connecting elements may be of such construction as to cause the associated blocks to be closely fitted together without flexibility of movement and to form a relatively rigid assembly structure.

Referring to Figs. 7 to 19, the house or building structure shown in Fig. 7 will be composed of the rectangular wall blocks N of Figs. 10 and 11, the square wall and roof blocks O of Figs. 12 and 13, the corner column or edge blocks P of Figs. 16 and 17, the triangular top wall roof support elements Q of Figs. 8 and 9, and the roof peak elements R of Figs. 18 and 19.

The windows S may be formed out of blocks, such as shown in Figs. 12 and 13, but with openings provided therein to simulate the top and bottom of a window structure.

It is also apparent that half or smaller, or even larger constructions may be utilized in connection with Figs. 10 to 13 so as to form the straight run sections of either the wall or the roof.

Referring to the structure of Fig. 10, the exterior faces 50 and 51 of the blocks N and O have lines or grooves 52, 53, 54 and 55 formed therein to simulate the bricks of an exterior wall. They also may be given a stucco effect or a wooden shingle effect to simulate other types of wall constructions.

The blocks 10 and 11 have the inwardly directed side flanges 56 and 57 which carry the short neck ball elements 58 and 59. The opposite wall sections 60 and 61 have the slots 62 and 63 formed in the exterior faces thereof which terminate in the openings 64 and 65 past which the balls 58 and 59 may be forced into position.

The necks 66 and 67 connecting the balls 58 and 59 to the walls or flanges 56 and 57 are so short that they will draw the walls or side flanges tightly and resiliently together to make a rigid assembled structure, such as shown in Fig. 7, without the flexibility indicated in Figs. 1 to 6.

Where the walls or flanges 56 and 57 are very thin, reinforcing brace elements may be utilized, as indicated at 68 and 69, at each ball 58 and 59, or, as indicated at 70, alongside of each slotted opening 64.

In the square element of Fig. 12, the walls 80 and 81 may have the slots 82 and 83, at the end of which are positioned the openings 84 and 85.

These openings 84 and 85 are designed so as to cooperate with the ball projections 86 and 87, as do the ball projections 58 and 59 of Figs. 10 and 11. It will be noted in Fig. 13 that these ball projections 86 and 87 project outwardly from the walls 89 and 90, and they have very short necks as compared to the necks 15 and 16 of Figs. 1 and 2.

The walls 80, 81, 89 and 90 of the elements of Figs. 12 and 13 are so much thinner than the walls or flanges in the structures of Figs. 1 to 5 that they require reinforcement, as indicated at 91 and 92.

By making the walls of the elements 10 and 13 much thinner, it is possible to achieve the clamping effect which will assure the rigid assembly structure, as shown in Fig. 7, with the ball elements 58, 59, 86 and 87 drawing the walls tightly together when they are inserted in their sockets.

The corner structures, as shown in Figs. 17 and 18, are formed by molding the H-shaped structure with a slot 100 at one end and the balls 101 at the other end. The sides 102 of the structure P are provided with the ball projections 103, while adjacent sides, particularly at the transverse portion of the H structure indicated at 104, are provided with the openings 105 to receive and engage projecting ball elements 59, 86 or 87 of the adjacent plaque structures of Figs. 10 to 13.

It will be noted that the corner elements P are molded with the recesses 106 and 107 to give a lightness of structure as well as resiliency which is desired to form a more rigid construction.

In the triangular member Q of Figs. 8 and 9, there are two oblique flanges 120 and 121, and a lower straight flange structure 122, together with a peak structure 123.

The base flange structure 122 is provided with the slotted openings 124, each of which openings is provided with reinforcement braces 125. (See particularly Fig. 9.)

These walls 124 are designed to receive the upwardly projecting balls 58 of the element N or 86 or 87 of the element O. The exterior wall 126 of the top wall element Q is exteriorly provided with the grooves or ridges 127 to give it the effect of a wooden slatted construction or a brick construction.

The flange structure 120 has the projecting short-necked balls 128 which are designed to be inserted into the openings 105 of the corner elements P, as shown in Fig. 7. The slotted openings 129 are designed to receive the projecting ball connection elements 103 of the corner elements P.

The corner elements P are linked together by the balls 103 being inserted in the slotted openings 100 of the next adjacent element.

The last or end element P will have its ball elements 101 fitted in the slotted openings 130 of the peak element 123, as is shown best at the upper corners of the building structure of Fig. 7.

In respect to the vertical corner beams formed of three elements P at each of the four corners of the building structure of Fig. 7, the uppermost corner elements P will have their ball connectors 101 inserted into the openings adjacent the end walls 132 of the triangular structures Q.

It will be noted here also that, due to the thinness of the wall sections, suitable braces 125 will be positioned at each side of a slotted opening 124, as well as at 132 on the inside of each ball connector 128.

The peak structure R is best shown in Figs. 18 and 19 and it extends across the top peak of the sloping roof of the structure of Fig. 7. It has the sloping top walls 140 and the end wall 141 carrying the ball connector 142 and the end wall 143 carrying the slot 144.

The balls 142 will be connected in the adjacent slots 144 of the next element to form a continuous horizontal linked construction, as shown at the top of Fig. 7.

The last ball 142 will be snapped into the socket 145 inside of the peak structure 123. The side-slotted openings 146 may receive the ball connector elements 58, 59, 86 or 87 of the square or rectangular plaque elements N and O.

To give the eave structure and permit the change of angle of the sloping roof to the vertical side wall of Fig. 7, the oblique connector elements T of Figs. 14 and 15 may be employed.

As shown in Figs. 14 and 15 there will be a base flange 160 carrying the central opening 161, in which is received the ball 87 of one of the square plaque elements O of Figs. 12 and 13.

Instead of the square element O of Figs. 12 and 13, it is also possible to have two of the elements T mounted by means of the ball elements 58 of the rectangular elements of Fig. 10.

The outwardly extending oblique flange element 161 has a tab 162 carrying the ball 163. This ball is designed to project from within a flange or wall 80 or 81 of Figs. 12 and 13, as shown in Fig. 15, so that there will be a row of these ball projections 163, as shown in Fig. 7.

It will be noted that this is the only connection in which the balls 163 project from within the walls to the outside of the walls, with all other connections having the balls projecting inwardly and sealed.

It is apparent that a large variety of other types of connections or plaques of hexagonal, octagonal, or even decagonal shapes may be formed, with various of the elements formed as window structures S or door structures, or to give various other elements which normally are associated with the wall of a house, office building, barn structure or railway station.

By varying the angle of the connector elements T or corner elements R, various types of peaked roofs may be obtained, as where it is designed to give church or public building constructions.

Cylindrical elements may be provided to give columns and the capitals may also be molded to give various Ionic, Doric or Corinthian styles.

The wall blocks, where used as roofs, may be given an arcuate shape to form either the barrel vault or soaring Gothic vault.

Not only it is possible to form buildings, but it is also possible to form railway cars or locomotives by providing suitable wheel structures, which may be assembled as already described. The essential structure depends upon the relatively hollow flange plaques with the slot and ball connections which hold the flanges resiliently and tightly together.

By slotting as well as holding the end of the slot, as indicated at 62 and 63 in Fig. 11, 84 and 85 in Fig. 12, 100 in Figs. 16 and 17, 124 and 129 in Figs. 8 and 9, and 146 in Figs. 18 and 19, the wall sections, although otherwise sufficiently strong to form a rigid structure, as indicated in Fig. 7, will nevertheless be of sufficient resilience to permit the ball elements 58, 59, 86, 87, 101, 103, 128, 142 and 163 to be snapped therethrough by reason of the inherent quality of the polyethylene material.

As many changes could be made in the above plastic block assembly, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A molded one piece box-like polyethylene polygonal building block having a flat base to form a building wall and inturned transverse perpendicular walls, said box having an open inside back, said walls on opposite sides of the block having projections and recesses, said projections extending outwardly from the middle portion of the walls and having a short cylindrical neck portion and an outer ball portion and said recesses consisting of slots extending perpendicularly inwardly from the base on the outside faces of the walls opposite the projections and terminating short of the inside edges of the walls and said slots having the same depth as the thickness of the wall so as to open the interior of the box to the outside at the ends of the slots, and triangular transverse reinforcement fins positioned inside the block at the junctions of the base and the walls and positioned adjacent said recesses and projections.

2. An open side thin molded box for a toy assembled building construction, the walls of which are composed of thin flexible molded polyethylene plastic having a polygonal base face wall and an open rear side and at least three inwardly extending side walls perpendicular to the face wall, male connection members projecting perpendicularly outwardly from at least one and at most two of said side walls, each male member having a narrow small diameter neck and a snap-in ball at the end of the neck, the remainder of the side walls having transverse recessed ball guide grooves extending along the side walls perpendicularly inwardly from said base face wall to a point short of the edges of the side walls and openings at the ends of the grooves to receive the snap-in balls, the interior of the box having transverse triangular reinforcing ribs closely adjacent to and on each side of each of said grooves.

References Cited in the file of this patent

UNITED STATES PATENTS

| | | |
|---|---|---|
| 419,099 | Arold | Jan. 7, 1890 |
| 2,449,167 | Hopewell | Sept. 14, 1948 |
| 2,487,654 | Hoffman et al. | Nov. 8, 1949 |
| 2,691,242 | Young | Oct. 12, 1954 |
| 2,714,269 | Charles | Aug. 2, 1955 |